US009406274B2

(12) United States Patent
Okumura

(10) Patent No.: US 9,406,274 B2
(45) Date of Patent: Aug. 2, 2016

(54) IMAGE PROCESSING APPARATUS, METHOD FOR IMAGE PROCESSING, AND PROGRAM

(71) Applicant: Sony Corporation, Minato-ku (JP)

(72) Inventor: Akihiro Okumura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/591,067

(22) Filed: Jan. 7, 2015

(65) Prior Publication Data

US 2015/0235612 A1  Aug. 20, 2015

(30) Foreign Application Priority Data

Feb. 17, 2014 (JP) ................................. 2014-027219

(51) Int. Cl.
*G09G 5/02* (2006.01)
*H04N 9/67* (2006.01)
*H04N 9/69* (2006.01)

(52) U.S. Cl.
CPC .. *G09G 5/02* (2013.01); *H04N 9/67* (2013.01); *H04N 9/69* (2013.01); *G09G 2340/06* (2013.01)

(58) Field of Classification Search
CPC .................... H04N 9/73; G09G 5/02

USPC ................. 345/589–591, 690; 358/515–520; 382/162, 167, 274; 348/223.1
See application file for complete search history.

(56) References Cited

U.S. PATENT DOCUMENTS

| 2003/0198401 | A1* | 10/2003 | Shimazaki | G09G 5/02 382/274 |
| 2006/0038891 | A1* | 2/2006 | Okutomi | H04N 9/045 348/222.1 |
| 2011/0317916 | A1* | 12/2011 | Zhang | G06T 3/4015 382/167 |
| 2015/0207962 | A1* | 7/2015 | Sugimoto | H04N 19/117 382/261 |
| 2015/0208051 | A1* | 7/2015 | Sugimoto | H04N 9/646 348/223.1 |

FOREIGN PATENT DOCUMENTS

JP  2011-35894  2/2011

* cited by examiner

*Primary Examiner* — Kimberly A Williams
(74) *Attorney, Agent, or Firm* — Oblon, McClelland, Maier & Neustadt, L.L.P.

(57) ABSTRACT

An image processing apparatus includes a gamma correction unit configured to perform gamma correction on linear-scale raw image signals to generate log-scale signals, a demosaicing unit configured to demosaic the log-scale signals generated by the gamma correction unit to generate image signals, and an inverse gamma correction unit configured to perform inverse gamma correction on the image signals generated by the demosaicing unit to generate linear-scale signals.

20 Claims, 14 Drawing Sheets

IMAGE PROCESSING APPARATUS, METHOD FOR IMAGE PROCESSING, AND PROGRAM

CROSS REFERENCE TO RELATED APPLICATIONS

This application claims the benefit of Japanese Priority Patent Application JP 2014-027219 filed Feb. 17, 2014, the entire contents of which are incorporated herein by reference.

BACKGROUND

The present disclosure relates to an image processing apparatus, a method for image processing, and a program. In particular, the present disclosure relates to an image processing apparatus, a method for image processing, and a program which each allow for conversion of raw signals into high-image-quality image signals.

An image-capture apparatus including a single charge coupled device (CCD) or complementary metal-oxide semiconductor (CMOS) image sensor demosaics linear-scale raw image signals outputted from the image sensor to generate RGB image signals. The image-capture apparatus then performs on the image signals, color gamut conversion according to changes in luminance level and then gamma correction to generate log-scale image signals.

On the other hand, methods for increasing color reproducibility in color gamut conversion have been devised in recent years (e.g., see Japanese Unexamined Patent Application Publication No. 2011-35894).

SUMMARY

However, in linear scale, the difference between colors varies with luminance. Accordingly, when linear-scale raw signals are demosaicked, artifacts such as false colors or zipper noise occur in the image signals, resulting in the degradation of image quality. That is, image signals generated through demosaicking, color gamut conversion, and gamma correction in this order has poor quality.

Even when gamma correction is performed prior to color gamut conversion, the image quality of the image signals is degraded as well, since processes such as color gamut conversion have to be performed in linear scale.

The present disclosure has been made in view of the foregoing and aims to allow for conversion of raw signals into high-image-quality image signals.

An image processing apparatus according to one embodiment of the present disclosure includes a gamma correction unit configured to perform gamma correction on linear-scale raw image signals to generate log-scale signals, a demosaicing unit configured to demosaic the log-scale signals generated by the gamma correction unit to generate image signals, and an inverse gamma correction unit configured to perform inverse gamma correction on the image signals generated by the demosaicing unit to generate linear-scale signals.

A method for image processing and a program according to other embodiments of the present disclosure correspond to the image processing apparatus according to the one embodiment of the present disclosure.

According to the one embodiment of the present disclosure, gamma correction is performed on linear-scale raw image signals to generate log-scale signals; the log-scale signals are demosaiced to generate image signals; and inverse gamma correction is performed on the image signals to generate linear-scale signals.

According to the one embodiment of the present disclosure, demosaicking can be performed. Further, according to the one embodiment of the present disclosure, raw signals can be converted into high-image-quality image signals.

Note that the effects described above are only illustrative and any effects described in the present disclosure can be obtained.

DETAILED DESCRIPTION OF EMBODIMENTS

Hereafter, the premises of the present disclosure and modes for carrying out the present disclosure (hereafter referred to as embodiments) will be described in the following order.

1. Premises of Present Disclosure (FIGS. 1, 2)
2. First Embodiment: Image Processing Apparatus (FIGS. 3 to 7)
3. Second Embodiment: Image Processing System (FIGS. 8 to 10)
4. Third embodiment: Image Processing Apparatus (FIGS. 11 to 15)
5. Fourth Embodiment: Computer (FIG. 16)

PREMISES OF PRESENT DISCLOSURE

Example of Image Processing Apparatus

Figure 1:
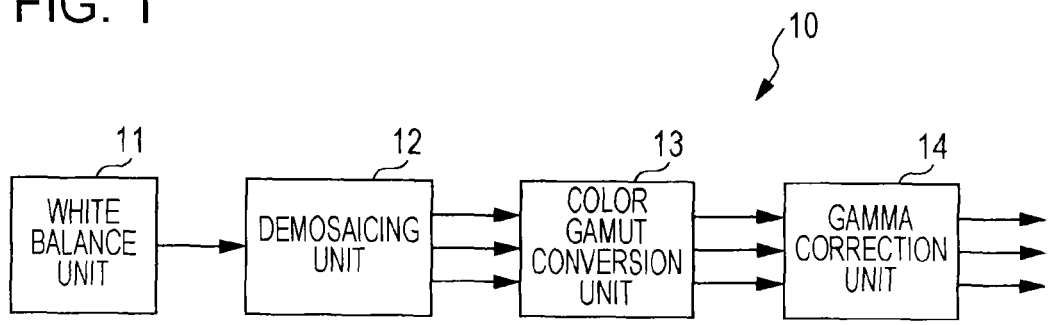
FIG. 1 is a block diagram showing an example of an image processing apparatus.

FIG. 1 is a block diagram showing an example of an image processing apparatus configured to demosaic linear-scale raw image signals outputted from a single CCD or CMOS image sensor.

An image processing apparatus 10 in FIG. 1 includes a white balance unit 11, a demosaicing unit 12, a color gamut conversion unit 13, and a gamma correction unit 14. For example, the image processing apparatus 10 may include a single CCD or CMOS image sensor, as well as an image-capture apparatus.

The white balance unit 11 of the image processing apparatus 10 adjusts the white balance by correcting the gain of linear-scale raw signals (mosaic signals $M_f$) outputted from a single CCD or CMOS image sensor (not shown). The white balance unit 11 provides the white balance-adjusted raw signals ($M_W$) to the demosaicing unit 12.

The demosaicing unit 12 demosaics the raw signals provided by the white balance unit 11 using directional linear minimum mean square-error estimation (DLMMSE) or the like. The demosaicing unit 12 then provides the resulting RGB image signals ($R_d$, $G_d$, $B_d$) to the color gamut conversion unit 13.

The color gamut conversion unit 13 performs color gamut conversion on the image signals provided by the demosaicing unit 12 in accordance with changes in luminance level and then provides the resulting signals to the gamma correction unit 14.

The gamma correction unit 14 performs gamma correction on the image signals ($R_c$, $G_c$, $B_c$) provided by the color gamut conversion unit 13 and then outputs the resulting log-scale image signals ($R_\gamma$, $G_\gamma$, $B_\gamma$).

As seen above, the image processing apparatus 10 demosaics linear-scale raw signals.

Linear-Scale Color Difference and Log-Scale Color Difference

Figure 2A:
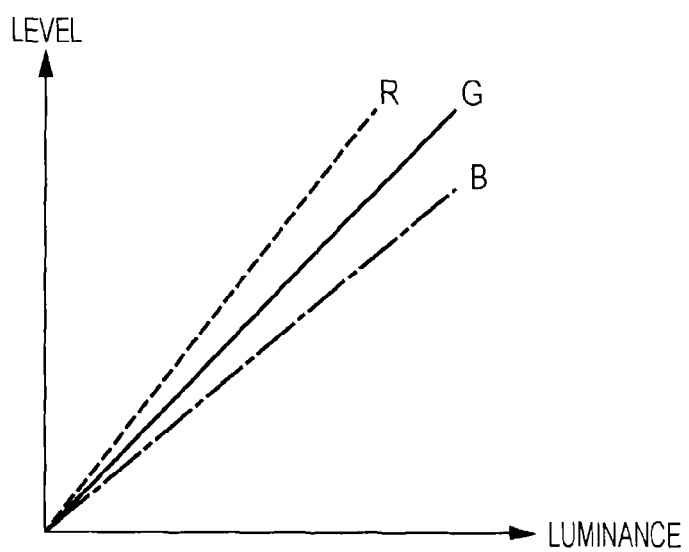
FIGS. 2A and 2B are graphs showing changes in color difference with respect to luminance in linear scale or log scale.
Figure 2B:
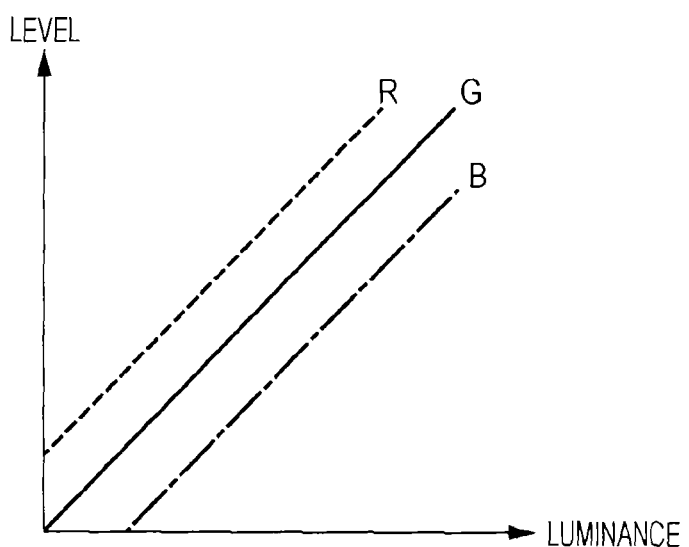

FIGS. 2A and 2B are graphs showing changes in the differences between predetermined colors with respect to luminance in linear scale or log scale.

In FIGS. 2A and 2B, the horizontal axis represents luminance, and the vertical axis represents the level of a raw signal our image signal.

In linear scale, as shown in FIG. 2A, the color difference (R−G) or (B−G) varies with luminance. Accordingly, when an apparatus like the image processing apparatus 10 demosaics linear-scale raw signals, artifacts such as false colors or zipper noise occur in the image signals, resulting in the degradation of image quality.

For example, in a demosaicing process using DLMMSE, the color differences between image signals of the pixels are predicted using the differences between raw signals of adjacent pixels. However, changes in luminance in the same screen make it difficult to accurately predict the color differences between image signals of the pixels. Thus, artifacts such as false colors or zipper noise occur in the image signals in the image signals, resulting in the degradation of image quality.

In log scale, on the other hand, as shown in FIG. 2B, the color difference (R−G) or (B−G) is constant regardless of luminance. Accordingly, when log-scale raw signals are demosaiced, artifacts such as false colors or zipper noise do not occur in the image signals, resulting in reductions in image quality degradation.

For this reason, the present disclosure involves performing gamma correction prior to demosaicing to change the scale of raw signals used in demosaicing to log scale. Thus, the image quality degradation of the image signals is reduced. The present disclosure also involves performing inverse gamma correction prior to color gamut conversion to change the scale of image signals used in color gamut conversion to linear scale. Thus, the image quality degradation of the image signals is prevented.

First Embodiment

Example Configuration of First Embodiment of Image Processing Apparatus

Figure 3:
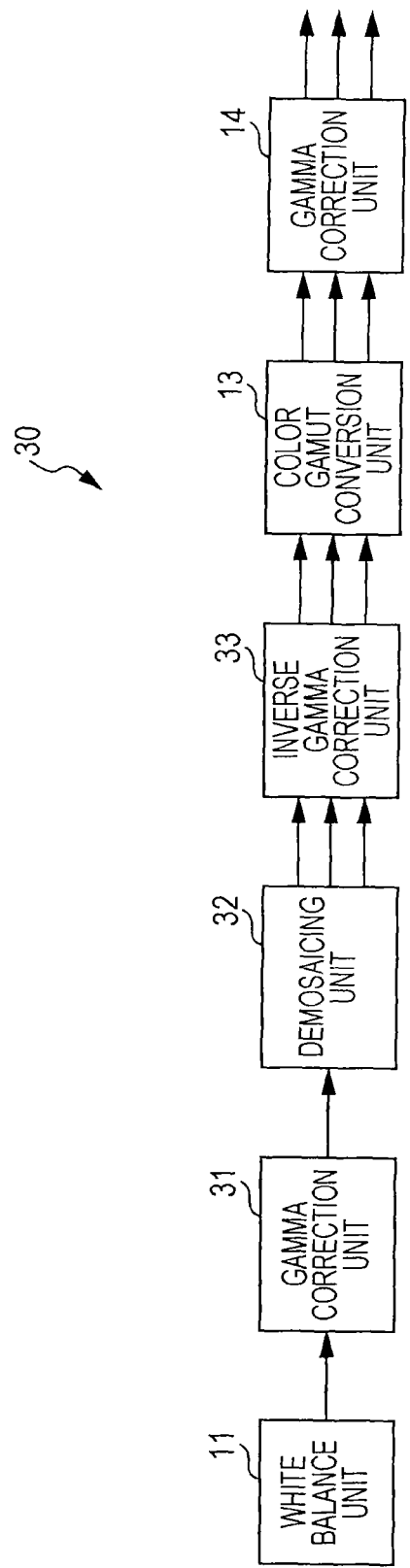
FIG. 3 is a block diagram showing an example configuration of a first embodiment of an image processing apparatus according to the present disclosure.

FIG. 3 is a block diagram showing an example configuration of a first embodiment of an image processing apparatus according to the present disclosure.

Of the elements shown in FIG. 3, the same elements as those in FIG. 1 are given the same reference signs and will not be described repeatedly.

An image processing apparatus 30 in FIG. 3 differs from the image processing apparatus 10 in FIG. 1 in that it includes a gamma correction unit 31, a demosaicing unit 32, and an inverse gamma correction unit 33 in place of the demosaicing unit 12. The image processing apparatus 30 changes the scale of raw signals from linear scale to log scale, demosaics the log-scale raw signals, returns the scale of the resulting RGB image signals to linear scale, and performs color gamut conversion on the linear-scale RGB image signals.

Specifically, the gamma correction unit 31 of the image processing apparatus 30 performs gamma correction on white balance-adjusted raw image signals ($M_W$) outputted from the white balance unit 11 to generate log-scale signals ($M_\gamma$), which are log-scale raw signals. The gamma correction unit 31 then provides the log-scale signals to the demosaicing unit 32.

The demosaicing unit 32 demosaics the log-scale signals provided by the gamma correction unit 31 using DLMMSE or the like to generate log-scale RGB image signals ($R_d$, $G_d$, $B_d$). The demosaicing unit 32 then provides the log-scale RGB image signals to the inverse gamma correction unit 33.

The inverse gamma correction unit 33 performs inverse gamma correction on the log-scale RGB image signals provided by the demosaicing unit 32 to generate linear-scale signals ($R_I$, $G_I$, $B_I$), which are linear-scale RGB image signals. The inverse gamma correction unit 33 then provides the linear-scale signals to the color gamut conversion unit 13. The color gamut conversion unit 13 performs color gamut conversion on these linear-scale signals.

Example of Color Arrangement of Image Pixels Corresponding to Raw Signals

Figure 4:
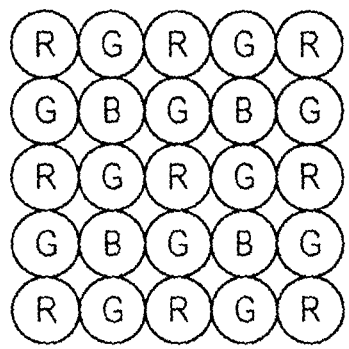
FIG. 4 is a diagram showing an example of the color arrangement of pixels in an image corresponding to raw signals.

FIG. 4 is a diagram showing an example of the color arrangement of image pixels corresponding to raw signals inputted to the image processing apparatus 30 in FIG. 3.

In FIG. 4, each circle represents a pixel, and R, G, or B described in a circle represents a color (red, green, or blue) assigned to a pixel represented by the circle.

In a single CCD or CMOS image sensor, one color is assigned to each pixel, and photoelectric signals representing the assigned colors are acquired as raw signals from the pixels. A Bayer array shown in FIG. 4 is an example of the array of the colors assigned to the pixels, that is, an example of the color array of the image pixels corresponding to raw signals.

The raw signals representing the colors assigned to the pixels are each converted into image signals including red (R), green (G), and blue (B) signals in a demosaicing process.

Gamma Correction

Figure 5:
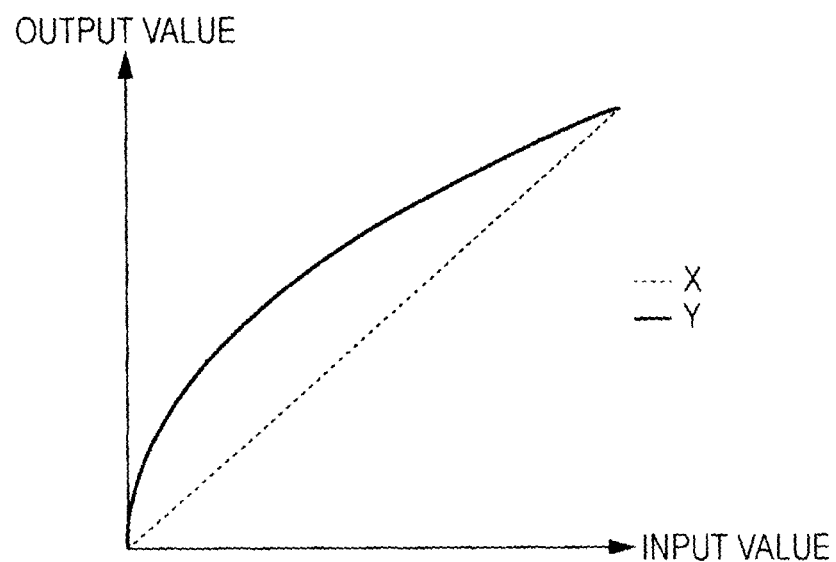
FIG. 5 is a graph showing an example of a gamma curve used in gamma correction.

FIG. 5 is a graph showing an example of a gamma curve used in gamma correction by the gamma correction units 31 and 14 in FIG. 3.

In FIG. 5, the horizontal axis represents the value (input value) before gamma correction, and the vertical axis represents the value (output value) after gamma correction.

The gamma correction units 31 and 14 each perform gamma correction using the gamma curve shown in FIG. 5 to change the scale from linear scale to log scale.

Inverse Gamma Correction

Figure 6:
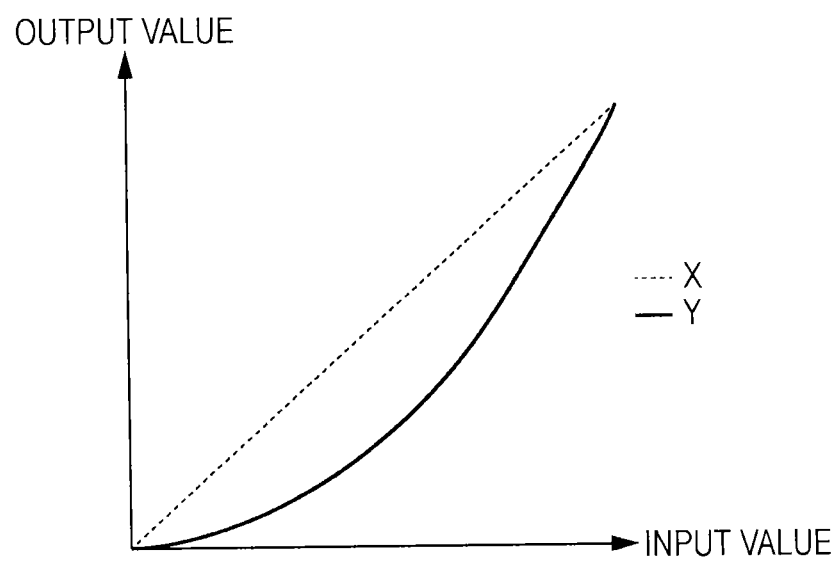
FIG. 6 is a graph showing an example of an inverse gamma curve used in inverse gamma correction.

FIG. 6 is a graph showing an inverse gamma curve used in inverse gamma correction by the inverse gamma correction unit 33 in FIG. 3.

In FIG. 6, the horizontal axis represents the value (input value) before inverse gamma correction, and the vertical axis represents the value (output value) after-inverse gamma correction.

The inverse gamma correction unit 33 performs inverse gamma correction using the inverse gamma curve shown in FIG. 6 to change the scale from log scale to linear scale.

Process Performed by Image Processing Apparatus

Figure 7:
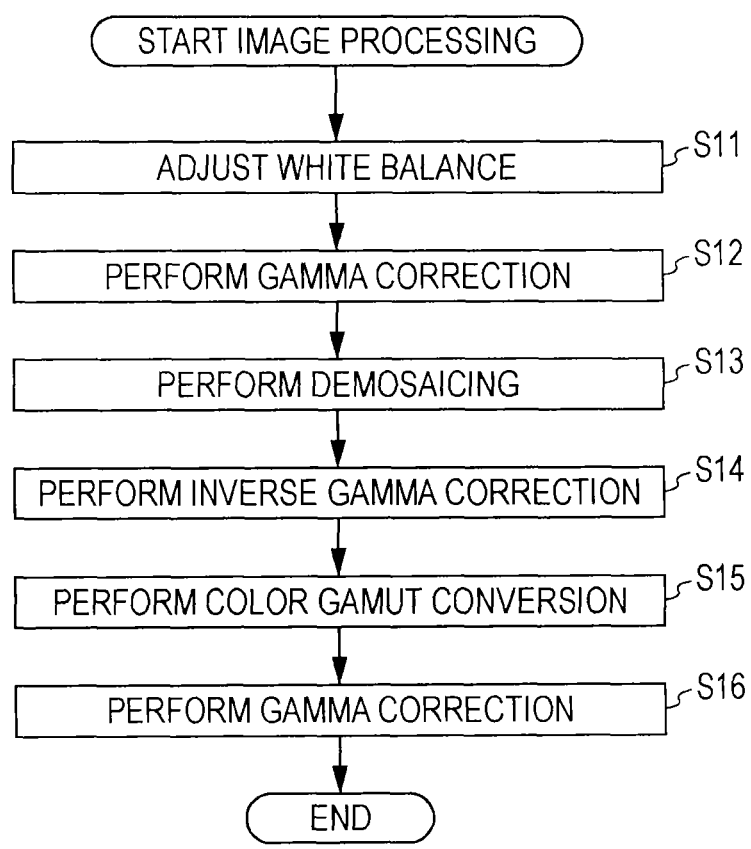
FIG. 7 is a flowchart showing image processing performed by the image processing apparatus in FIG. 3.

FIG. 7 is a flowchart showing image processing performed by the image processing apparatus 30 in FIG. 3. This image processing is started, for example, when the image processing apparatus 30 receives linear-scale raw image signals from a single CCD or CMOS image sensor (not shown).

In step S11, the white balance unit 11 of the image processing apparatus 30 adjusts the white balance of the received raw signals and then provides the resulting raw signals to the gamma correction unit 31.

In step S12, the gamma correction unit 31 performs gamma correction on the white balance-adjusted raw signals provided by the white balance unit 11 to generate log-scale signals and then provides the log-scale signals to the demosaicing unit 32.

In step S13, the demosaicing unit 32 demosaics the log-scale signals provided by the gamma correction unit 31 using DLMMSE or the like to generate RGB image signals and then provides the RGB image signals to the inverse gamma correction unit 33.

In step S14, the inverse gamma correction unit 33 performs inverse gamma correction on the log-scale RGB image signals provided by the demosaicing unit 32 to generate linear-scale signals and then provides the linear-scale signals to the color gamut conversion unit 13. In step S15, the color gamut conversion unit 13 performs color gamut conversion on the linear-scale signals provided by the inverse gamma correction unit 33 and then provides the resulting linear-scale signals to the gamma correction unit 14.

In step S16, the gamma correction unit 14 performs gamma correction on the linear-scale signals ($R_c$, $G_c$, $B_c$) provided by the color gamut conversion unit 13 and outputs the resulting log-scale image signals, thereby ending the process.

As seen above, in the image processing apparatus 30, the gamma correction unit 31 performs gamma correction on linear-scale raw image signals, and the demosaicing unit 32 demosaics the resulting log-scale signals. Thus, it is possible to accurately predict the color differences between image signals of the pixels in the demosaicing process using DLMMSE and to reduce occurrence of artifacts such as false colors or zipper noise or in the image signals.

Further, in the image processing apparatus 30, the inverse gamma correction unit 33 performs inverse gamma correction on the RGB image signals generated in the demosaicing process. Thus, color gamut conversion can be performed on the linear-scale image signals to prevent the image quality degradation of the image signals.

As a result, the image processing apparatus 30 can convert the raw signals into high-image-quality image signals which include less artifacts and have undergone color gamut conversion in linear scale.

Note that by obtaining the color differences using division, it is possible to make the linear-scale color differences constant regardless of luminance to reduce occurrence of artifacts in the image signals. However, division is not preferable because it may desire a larger circuit size and longer calculation time than subtraction.

Second Embodiment

Example Configuration of One Embodiment of Image Processing System

Figure 8:
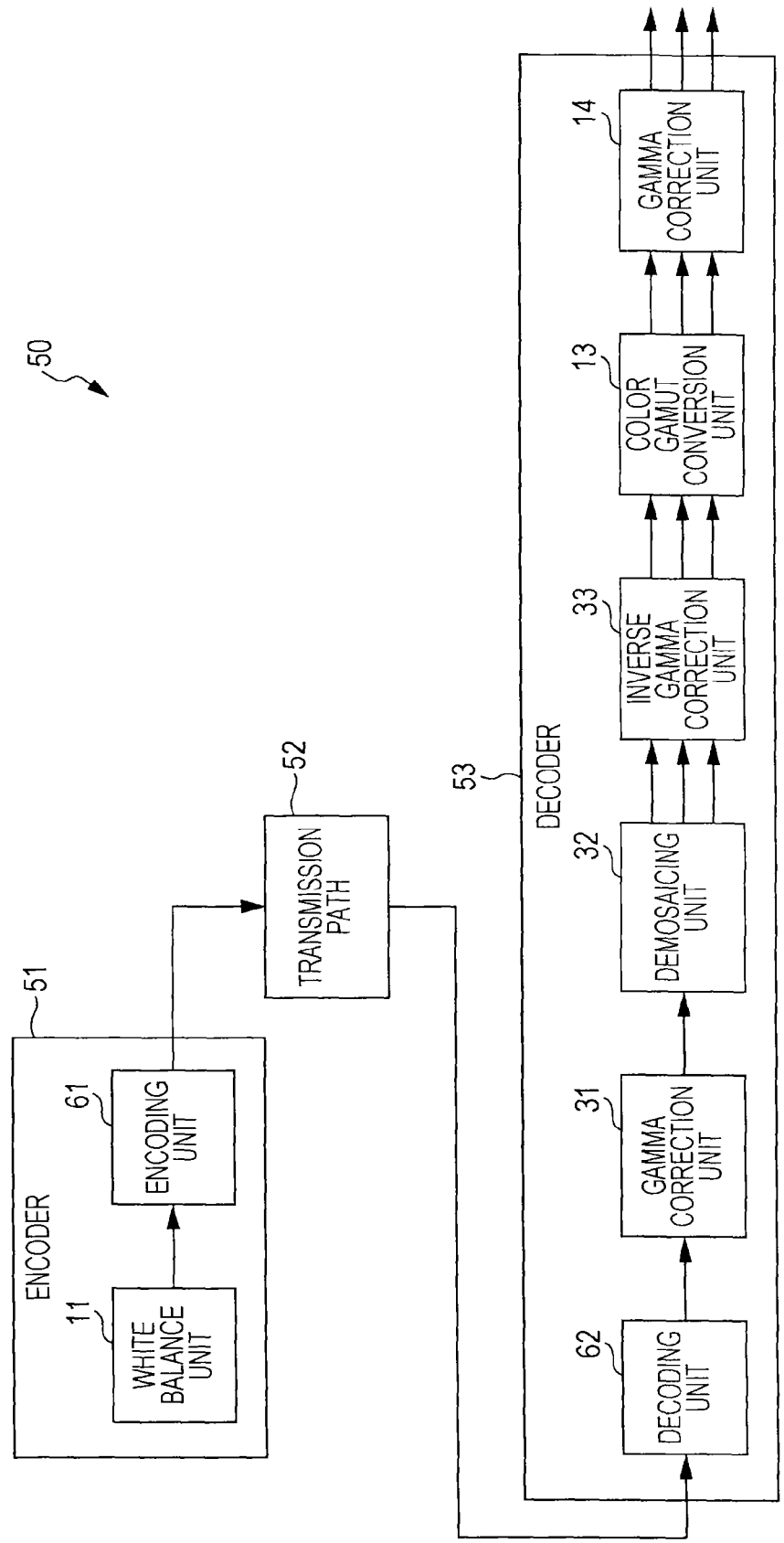
FIG. 8 is a block diagram showing an example configuration of one embodiment of an image processing system according to the present disclosure.

FIG. 8 is a block diagram showing an example configuration of one embodiment of an image processing system according to the present disclosure.

Of the elements shown in FIG. 6, the same elements as those in FIG. 3 are given the same reference signs and will not be described repeatedly.

An image processing system 50 in FIG. 8 includes an encoder 51, a wired or wireless transmission path 52, and a decoder 53. In the image processing system 50, raw signals encoded by the encoder 51 are transmitted to the decoder 53 via the transmission path 52 and then converted into image signals.

Specifically, the encoder 51 includes a white balance unit 11 and an encoding unit 61. The encoding unit 61 encodes white balance-adjusted raw signals outputted from the while balance unit 11 using a predetermined encoding system. The encoding unit 61 then transmits the encoded raw signals to the decoder 53 via the wireless transmission path 52 such as a local area network, Internet, or digital satellite broadcasting.

The decoder 53 includes a decoding unit 62, a gamma correction unit 31, a demosaicing unit 32, an inverse gamma correction unit 33, a color gamut conversion unit 13, and a gamma correction unit 14. The decoding unit 62 receives the encoded raw signals transmitted from the encoder 51 via the transmission path 52 and then decodes them using a system corresponding to the encoding system of the encoding unit 61. The decoding unit 62 then provides the resulting raw signals to the gamma correction unit 31. The gamma correction unit 31 performs gamma correction on the raw signals provided by the decoding unit 62.

Process Performed by Image Processing System

Figure 9:
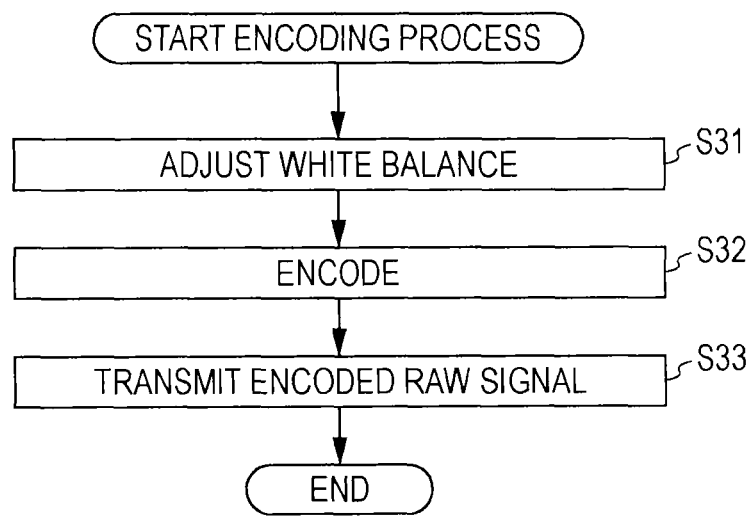
FIG. 9 is a flowchart showing an encoding process performed by an encoder in FIG. 8.

FIG. 9 is a flowchart showing an encoding process performed by the encoder 51 of the image processing system 50 in FIG. 8. This encoding process is started, for example, when the encoder 31 receives linear-scale raw image signals from a single CCD or CMOS image sensor (not shown).

In step S31, the white balance unit 11 of the encoder 51 adjusts the white balance of the received raw signals and then provides the resulting raw signals to the encoding unit 61.

In step S32, the encoding unit 61 encodes the raw signals provided by one white balance unit 11 using a predetermined encoding system. In step S33, the encoding unit 61 transmits the encoded raw signals to the decoder 53 via the transmission path 52, thereby ending the process.

Figure 10:
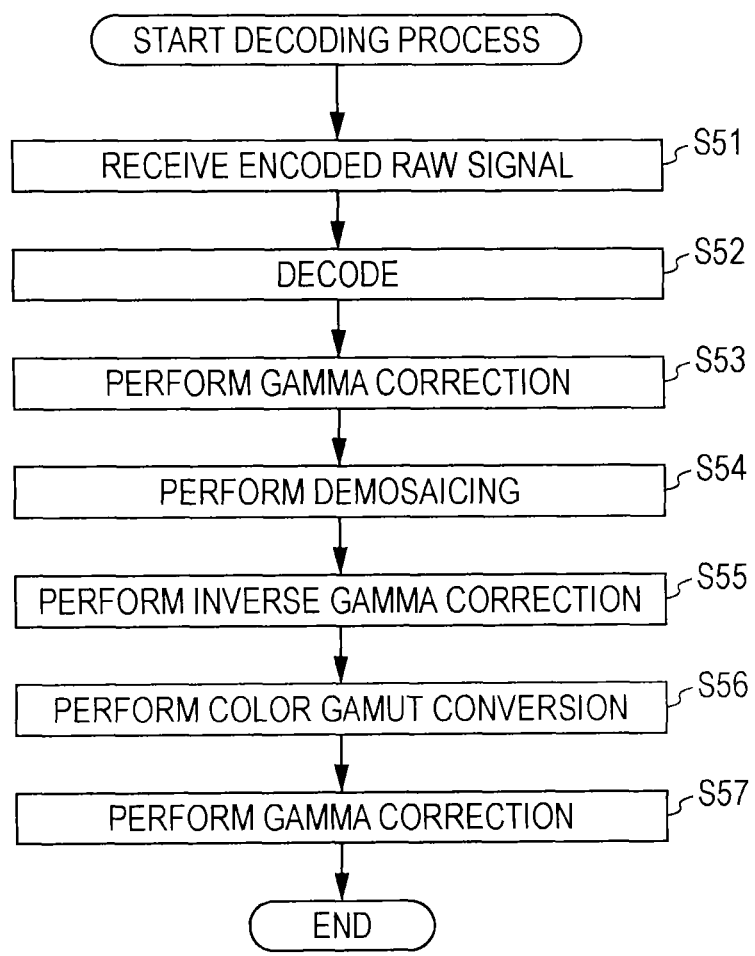
FIG. 10 is a flowchart showing a decoding process performed by a decoder in FIG. 8.

FIG. 10 is a flowchart showing a decoding process performed by the decoder 53 of the image processing system 50. This decoding process is started when the decoder 53 receives the encoded raw signals from the encoder 51 via the transmission path 52.

In step S51, the decoding unit 62 of the decoder 53 receives the encoded raw signals. In step S52, the decoding unit 62 decodes the encoded raw signals using a system corresponding to the encoding system of the encoding unit 61 and then provides the resulting raw signals to the gamma correction unit 31.

In step S53, the gamma correction unit 31 performs gamma correction on the raw signals provided by the decoding unit 62 to generate log-scale signals and then provides them to the demosaicing unit 32.

Steps S54 to S57 are similar to steps S13 to S16 in FIG. 7 and therefore will not be described.

While the encoded raw signals are transmitted from the encoder 51 to the decoder 53 via the transmission path 52 in the second embodiment, they may be transmitted via a recording medium. That is, the encoder 51 may record the encoded raw signals in a recording medium, and the decoder 53 may read the encoded raw signals therefrom.

Third Embodiment

Example Configuration of Image Processing Apparatus

Figure 11:
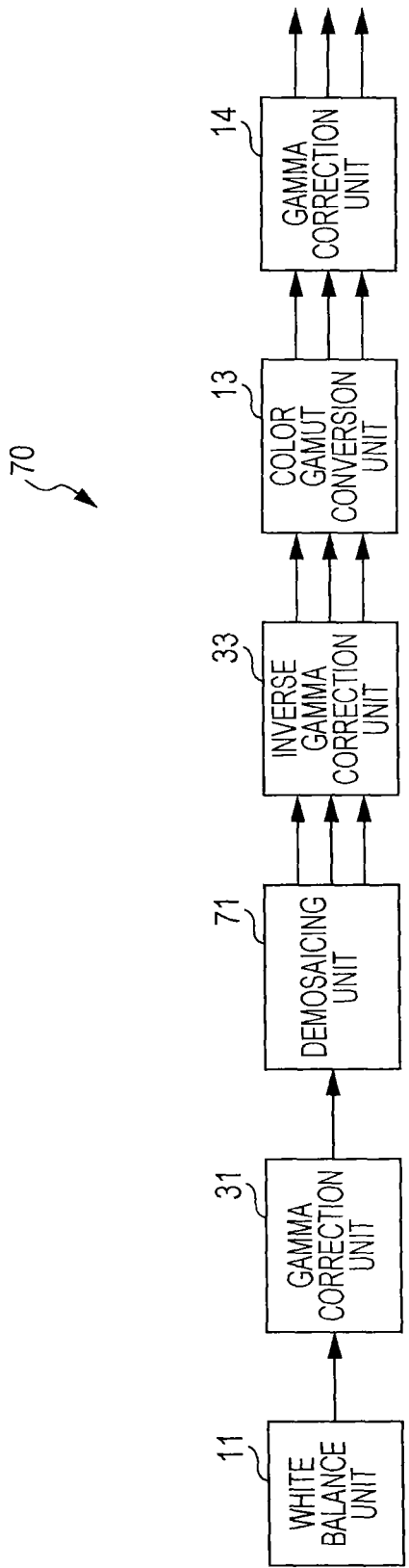
FIG. 11 is a block diagram showing an example configuration of a second embodiment of the image processing apparatus according to the present disclosure.

FIG. 11 is a block diagram showing an example configuration of a second embodiment of the image processing apparatus according to the present disclosure.

Of the elements shown in FIG. 11, the same elements as those in FIG. 3 are given the same reference signs and will not be described repeatedly.

An image processing apparatus 70 in FIG. 11 differs from the image processing apparatus 30 in FIG. 3 in that it includes a demosaicing unit 71 in place of the demosaicing unit 32. The image processing apparatus 70 performs demosaicing through classification and adaptation processes.

Specifically, the demosaicing unit 71 of the image processing apparatus 70 demosaics log-scale signals provided by the gamma correction unit 31 through classification and adaptation processes to generate log-scale RGB image signals. The demosaicing unit 71 then provides the log-scale RGB image signals to the inverse gamma correction unit 33.

Example Configuration of Demosaicing Unit

Figure 12:
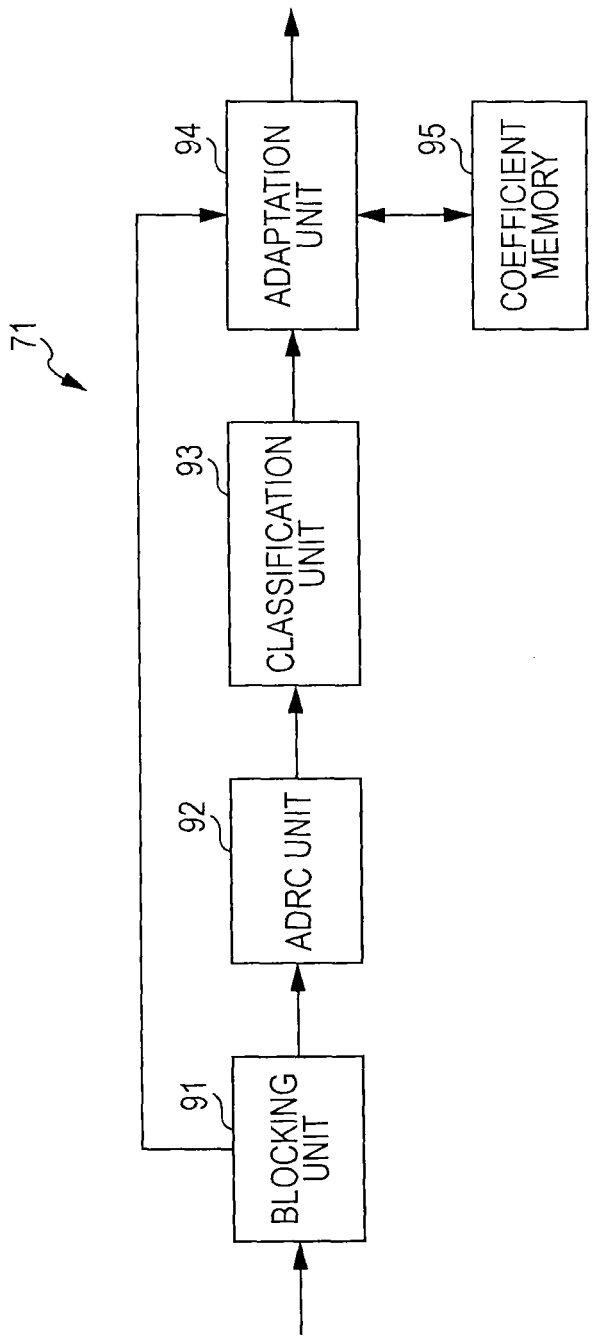
FIG. 12 is a block diagram showing an example configuration of a demosaicing unit in FIG. 11.

FIG. 12 is a block diagram showing an example configuration of the demosaicing unit 71 in FIG. 11.

The demosaicing unit 71 in FIG. 12 includes a blocking unit 91, an ADRC unit 92, a classification unit 93, an adaptation unit 94, and a coefficient memory 95 and performs a demosaicing process similar to a demosaicing process disclosed in Japanese Unexamined Patent Application Publication No. 2000-308079.

Specifically, the blocking unit 91 of the demosaicing unit 71 sequentially determines, as the pixel of interest, pixels in an image corresponding to RGB image signals to be generated in a demosaicing process. Then, with respect to for each of the colors of the image signals to be generated, the blocking unit 91 extracts, as a class tap, the log-scale signals of multiple pixels adjacent to a position corresponding to the pixel of interest, from the log-scale signals provided by the gamma correction unit 31.

This class tap varies with the pixel color of a log-scale signal corresponding to the pixel of interest and the colors of the image signals to be generated in the demosaicing process. For example, if the color array corresponding to the raw signals is the color array in FIG. 4, the class tap varies depending on which of a red pixel, a green pixel between red pixels, a blue pixel, and a green pixel between blue pixels the pixel of interest is and which of red, green, and blue the color of an image signal to be generated in the demosaicing process is. The blocking unit 91 then provides the extracted class tap to the ADRC unit 92.

The blocking unit 91 also extracts, as a prediction tap, the log-scale signals of the multiple pixels adjacent to the position corresponding to the pixel of interest from the log-scale signals and provides the prediction tap to the adaptation unit 94. Note that the pixels corresponding to the class tap and the pixels corresponding to the prediction tap may be the same or different.

The ADRC unit 92 performs adaptive dynamic range coding (ADRC) on the class tap provided by the blocking unit 91 to generate a re-quantization code.

Specifically, as an ADRC process, the ADRC unit 92 performs re-quantization by dividing the difference between the class tap maximum value MAX and the class tap minimum value MIN by a specified bit number p using Formula (1) below.

$$qi=[(ki-\text{MIN}+0.5)*2^p/\text{DR}] \quad (1)$$

where [ ] means that the fractional portion of a value in [ ] is dropped; ki represents the i-th log-scale signal of the class tap; and qi represents the re-quantization code of the i-th log-scale signal of the class tap; and DR represents a dynamic range and specifically MAX−MIN+1. The ADRC unit 92 then provides the re-quantization code to the classification unit 93.

The classification unit 93 classifies the pixels of interest into classes using the re-quantization code provided by the ADRC unit 92 for each of the colors of the image signals to be generated. Specifically, the classification unit 93 calculates a class number "class" representing a class using the re-quantization code and Formula (2) below.

$$\text{class} = \sum_{i=1}^{n} qi(2^p)^{i-1} \quad (2)$$

where n represents the number of the log-scale signals forming the class tap. The classification unit 93 then provides the class numbers to the adaptation unit 94.

The coefficient memory 95 stores prediction coefficients corresponding to the class numbers provided by the classification unit 93. As will be described later, these prediction coefficients are previously learned by, for each class number, solving a formula indicating a relationship between a teacher signal of each pixel, student signals of pixels corresponding to the pixel, and a prediction coefficient. The teacher signal is one of teacher signals corresponding to the image signals; the student signals are included in student signals corresponding to the log-scale signals; and the prediction tap includes log-scale signals of pixels corresponding to the pixel of interest.

The adaptation unit 94 reads prediction coefficients corresponding to the class numbers provided by the classification unit 93 from the coefficient memory 95 for each color. The adaptation unit 94 then generates an image signal of the pixel of interest by performing a prediction operation using the prediction coefficients read from the coefficient memory 95 and the prediction tap provided by the blocking unit 91 for each color. The adaptation unit 94 then provides the RGB image signals of the respective pixels to the inverse gamma correction unit 33 in FIG. 11.

While the demosaicing unit 71 calculates class numbers using an ADRC process, it may calculate class numbers using a process other than an ADRC process. For example, the demosaicing unit 71 may perform data compression such as discrete cosine transform (DCT), vector quantization (VQ), or differential pulse code modulation (DPCM) and then use the resulting amounts of data as class numbers.

Prediction Operation

Next, there will be described a prediction operation performed by the adaptation unit 94 in FIG. 13 and learning of prediction coefficients used in the prediction operation.

If a linear first-order prediction operation, for example, is used as a prediction operation, an R, G, or B color image signal y of each pixel are obtained using a linear first-order equation below.

$$y = \sum_{i=1}^{n} W_i x_i \quad (3)$$

where $x_i$ represents the i-th pixel log-scale signal of the log-scale signals forming the prediction tap with respect to the image signal y; $W_i$ represents the i-th prediction coefficient by which the i-th pixel log-scale signal is multiplied; and n represents the number of pixels corresponding to the log-scale signals forming the prediction tap. These definitions also apply to Formulas (4), (5), (7), and (10) below.

The predicted value $y_k'$ of an R, G, or color B image signal y of each pixel of the k-th sample are represented by Formula (4) below.

$$y_k' = W_1 \times x_{k1} + W_2 \times x_{k2} + \ldots + W_n \times x_{kn} \quad (4)$$

where $x_{ki}$ represents the i-th pixel log-scale signal of the log-scale signals forming the prediction tap with respect to the true value of the predicted value $y_k'$. This definition also applies to Formulas (5), (8), and (9) below.

A predicted error $e_k$ is represented by Formula (5) below.

$$e_k = y_k - [W_1 \times x_{k1} + W_2 \times x_{k2} + \ldots + W_n \times x_{kn}] \quad (5)$$

where $y_k$ represents the true value of the predicted value $y_k'$.

A prediction coefficient $W_i$ which makes the prediction error $e_k$ of Formula (5) zero is optimal to predict the true value $y_k$. However, if the number of learning samples is smaller than n, the prediction coefficient $W_i$ is not determined uniquely.

If the least squares method, for example, is used as a criterion indicating that a prediction coefficient $W_i$ is optimal, an optimal prediction coefficient $W_i$ can be obtained by minimizing the total sum E of square errors represented by Formula (6) below.

$$E = \sum_{k=1}^{m} e_k^2 \quad (6)$$

The minimum value of the total sum E of square errors represented by Formula (6) is given by $W_i$ which makes zero the value obtained by partially differentiating the total sum E by the prediction coefficient $W_i$, as shown in Formula (7) below.

$$\frac{\partial E}{\partial W_i} = \sum_{k=1}^{m} 2\left(\frac{\partial e_k}{\partial W_i}\right) e_k = \sum_{k=1}^{m} 2 \times k_i \cdot e_k = 0 \quad (7)$$

If $X_{ij}$ and $Y_i$ are defined as shown in Formulas (8) and (9) below, respectively, Formula (7) can be expressed in a matrix, as shown in Formula (10) below.

$$X_{ij} = \sum_{k=1}^{m} x_{ki} \times x_{kj} \quad (8)$$

$$Y_i = \sum_{k=1}^{m} x_{ki} \times y_k \quad (9)$$

$$\begin{pmatrix} X_{11} & X_{12} & \ldots & X_{1n} \\ X_{21} & X_{22} & \ldots & X_{2n} \\ \vdots & \vdots & \vdots & \vdots \\ X_{n1} & X_{n2} & \ldots & X_{nn} \end{pmatrix} \begin{pmatrix} W_1 \\ W_2 \\ \vdots \\ W_n \end{pmatrix} = \begin{pmatrix} Y_1 \\ Y_2 \\ \vdots \\ Y_n \end{pmatrix} \quad (10)$$

The normal equation of Formula (10) can be solved for the prediction coefficient $W_i$ by using a typical matrix solution such as the sweep-out method (Gauss-Jordan elimination).

As seen above, an optimal prediction coefficient $W_i$ can be learned for each class number by setting up and solving the normal equation of Formula (10) for each class number.

Note that an image signal y may be obtained using a second- or higher-order equation rather than the linear first-order equation shown in Formula (3).

Process Performed by Image Processing Apparatus

Image processing performed by the image processing apparatus 70 in FIG. 11 is similar to that in FIG. 7 except that the demosaicing process thereof differs from step S13 of FIG. 7. Accordingly, only the demosaicing process will be described below.

Figure 13:
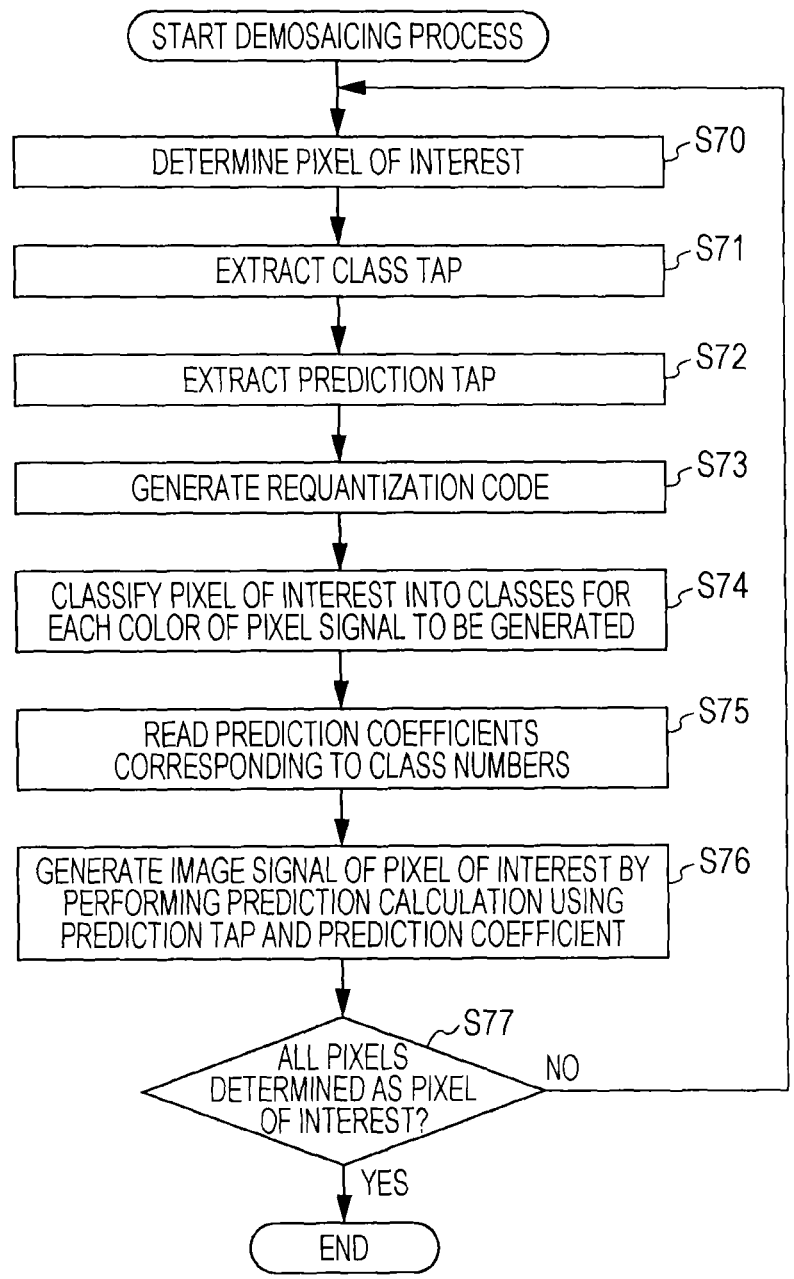
FIG. 13 is a flowchart showing a demosaicking process performed by the demosaicing unit in FIG. 11.

FIG. 13 is a flowchart showing a demosaicing process performed by the demosaicing unit 71 of the image processing apparatus 70.

In step S70, the blocking unit 91 (FIG. 12) of the demosaicing unit 71 determines, as the pixel of interest, a pixel which has yet to be determined as the pixel of interest, of pixels in an image corresponding to RGB image signals to be generated in the demosaicing process.

In step S71, the blocking unit 91 extracts, as a class tap, the log-scale signals of multiple pixels adjacent to a position corresponding to the pixel of interest from the log-scale signals provided by the gamma correction unit 31 for each of the colors of the image signals to be generated and then provides the class tap to the ADRC unit 92.

In step S72, the blocking unit 91 also extracts, as a prediction tap, the log-scale signals of the multiple pixels adjacent to the position corresponding to the pixel of interest from the log-scale signals provided by the gamma correction unit 31 and then provides the prediction tap to the adaptation unit 94.

In step S73, the ADRC unit 92 performs ADRC on the class tap provided by the blocking unit 91 to generate a re-quantization code and then provides it to the classification unit 93.

In step S74, the classification unit 93 classifies the pixels of interest into classes using the re-quantization code provided by the ADRC unit 92 for each of the colors of the image signals to be generated. The classification unit 93 then provides class numbers representing the classified classes to the adaptation unit 94.

In step S75, the adaptation unit 94 reads, from the coefficient memory 95, prediction coefficients corresponding to the class numbers provided by the classification unit 93 for each color. In step S76, the adaptation unit 94 generates an image signal of the pixel of interest by performing a prediction operation using the prediction tap provided by the blocking unit 91 and the prediction coefficients read from the coefficient memory 95 for each color.

In step S77, the blocking unit 91 determines whether all image pixels corresponding to the RGB image signals to be generated in the demosaicing process have been determined as the pixel of interest. If not so, the process returns to step S70, and steps S70 to S77 are repeated until all the pixels are determined as the pixel of interest.

If so, the adaptation unit 94 provides the RGB image signals of all the pixels to the AD converter 33 in FIG. 11, thereby ending the demosaicing process.

As seen above, in the image processing apparatus 70, the gamma correction unit 31 performs gamma correction on linear-scale raw image signals, and the demosaicing unit 71 demosaics the resulting log-scale signals through classification and adaption processes. Thus, the demosaiced RGB image signals can be accurately predicted.

As described above, in linear scale, the difference between colors varies with luminance. Accordingly, if prediction coefficients are learned or prediction operations are performed using linear-scale raw signals, the learning accuracy or prediction accuracy becomes poor. On the other hand, in log scale, the difference between colors does not vary with luminance. Accordingly, if prediction coefficients are learned or prediction operations are performed using log-scale raw signals, the learning accuracy or prediction accuracy becomes good. Thus, occurrence of artifacts such as false colors or zipper noise in the demosaiced RGB image signals can be reduced.

Example Configuration of Learning Apparatus

Figure 14:
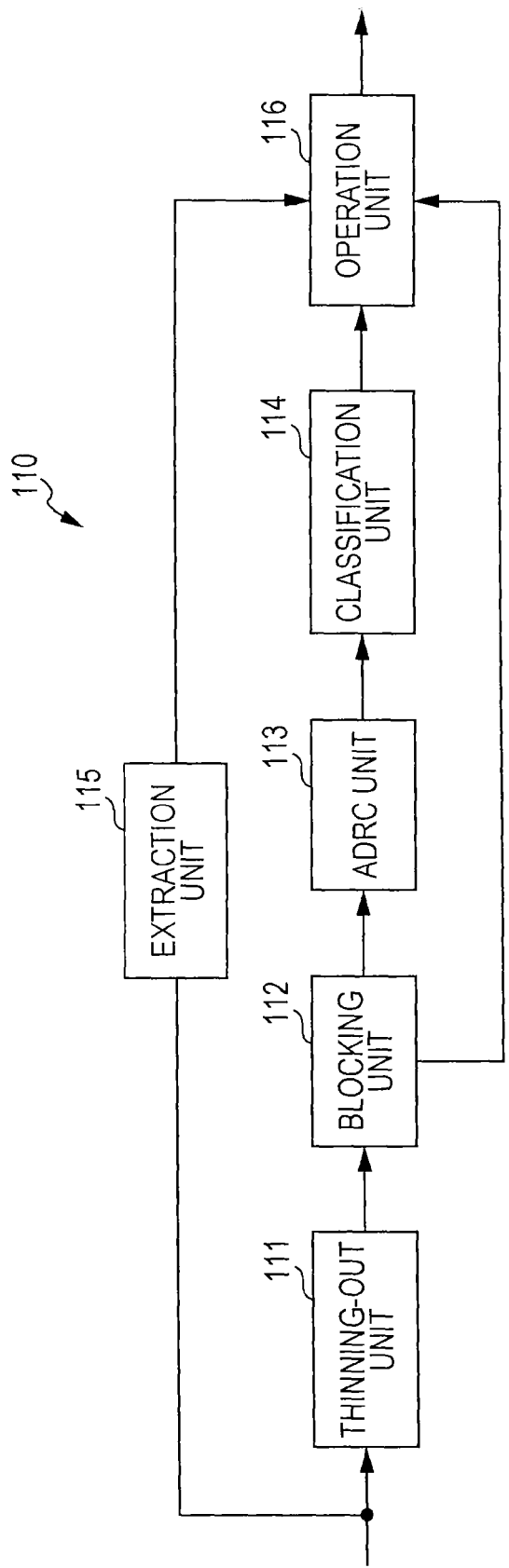
FIG. 14 is a block diagram showing an example configuration of a learning apparatus.

FIG. 14 is a block diagram showing an example configuration of a learning apparatus 110 configured to learn prediction coefficients stored in the coefficient memory 95 in FIG. 12.

The learning apparatus 110 in FIG. 14 includes a thinning-out unit 111, a blocking unit 112, an ADRC unit 113, a classification unit 114, an extraction unit 115, and an operation unit 116.

The learning apparatus 110 receives ideal RGB image signals of multiple learning images as teacher signals used to learn prediction coefficients.

The thinning-out unit 111 of the learning apparatus 110 generates student signals corresponding to the log-scale signals by thinning out image signals of two colors from the teacher signals inputted from outside, in accordance with a color array corresponding to the log-scale signals. The thinning-out unit 111 then provides the student signals to the blocking unit 112.

The blocking unit 112 sequentially determines, as the pixel of interest, pixels in an image corresponding to each teacher signal. As with the blocking unit 91 in FIG. 12, the blocking unit 112 extracts a class tap from the student signals provided by the thinning-out unit 111 for each of the colors of the teacher signals and provides the class tap to the ADRC unit 113. Further, as with the blocking unit 91, the blocking unit 112 extracts a prediction tap from the student signals and provides the prediction tap to the operation unit 116.

As with the ADRC unit 92, the ADRC unit 113 performs ADRC on the class tap provided by the blocking unit 112 to generate a re-quantization code and provides it to the classification unit 114.

As with the classification unit 93, the classification unit 114 classifies the pixels of interest into classes using the re-quantization code provided by the ADRC unit 113 for each of the colors of the teacher signals and provides the resulting class numbers to the operation unit 116.

The extraction unit 115 extracts the teacher signals of the pixels of interest from the teacher signals inputted from outside and provides them to the operation unit 116.

The operation unit 116 sums up the teacher signals of the pixels of interest provided by the extraction unit 115 and the prediction tap provided by the blocking unit 112 with respect to the class numbers of the pixels of interest provided by the classification unit 114 for each of the colors of the teacher signals.

Specifically, the operation unit 116 defines the student signals of each pixel of the prediction tap as $x_{ki}$ and $x_{kj}$ where i and j are each 1, 2, . . . , n and calculates and sums up $x_{ki} \times x_{kj}$ in the matrix on the left side of Formula (10) with respect to the class number of each of the colors of the pixels of interest.

The operation unit 116 also defines the teacher signal and student signal of each of the colors of the pixels of interest as $y_k$ and $x_{ki}$, respectively, and calculates and sums up $x_{ki} \times y_k$ in the matrix on the right side of Formula (10) with respect to the class number of each of the colors of the pixels of interest.

The operation unit 116 then obtains optimal prediction coefficients corresponding to the respective class numbers by solving the normal equations of Formula (10) corresponding to the respective class numbers, generated by summing up all pixels of all teacher signals as the pixels of interest. The prediction coefficients corresponding to the respective class numbers are stored in the coefficient memory 95 of FIG. 12.

Learning Process

Figure 15:
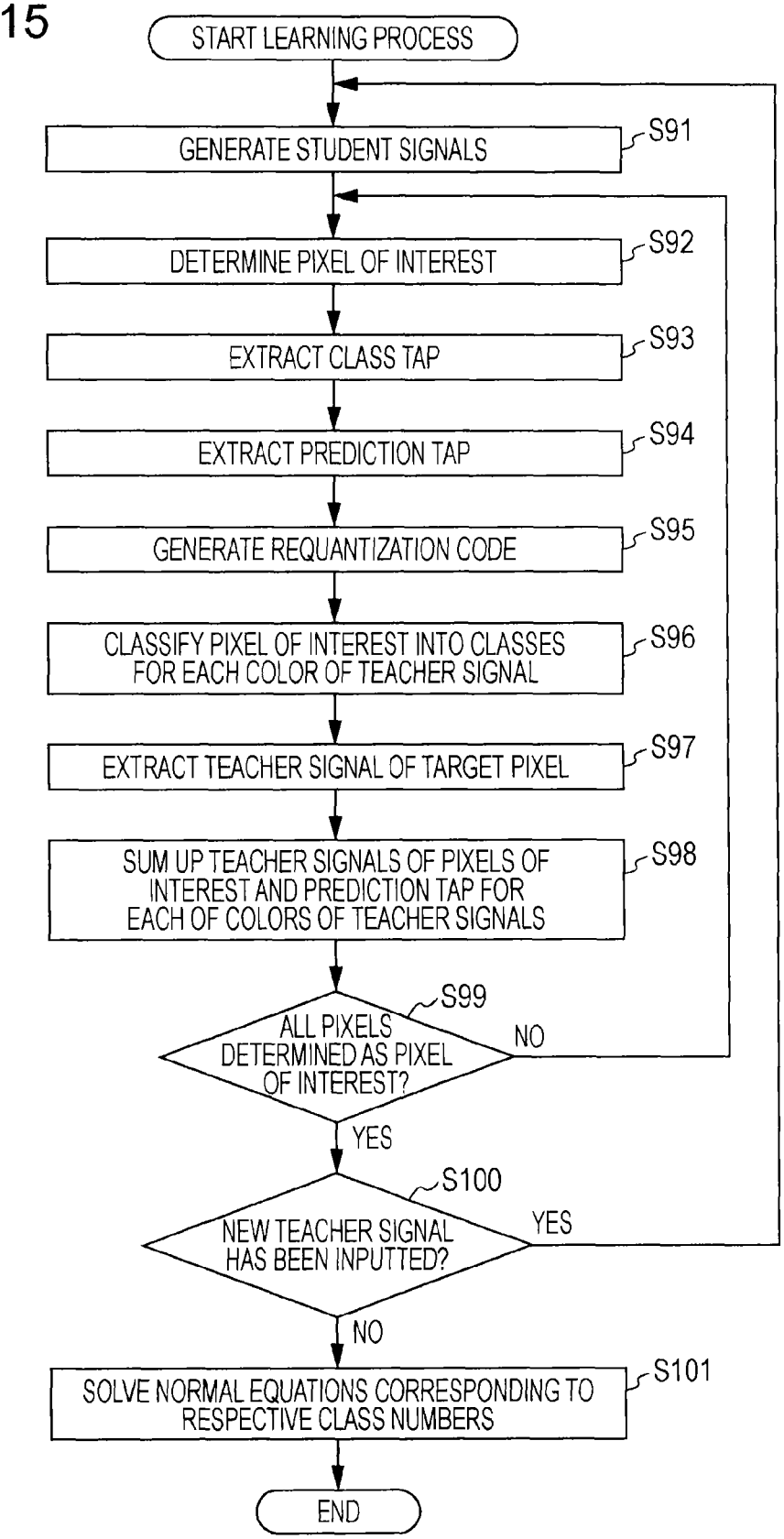
FIG. 15 is a flowchart showing a learning process performed by the learning apparatus in FIG. 14.
Figure 16:
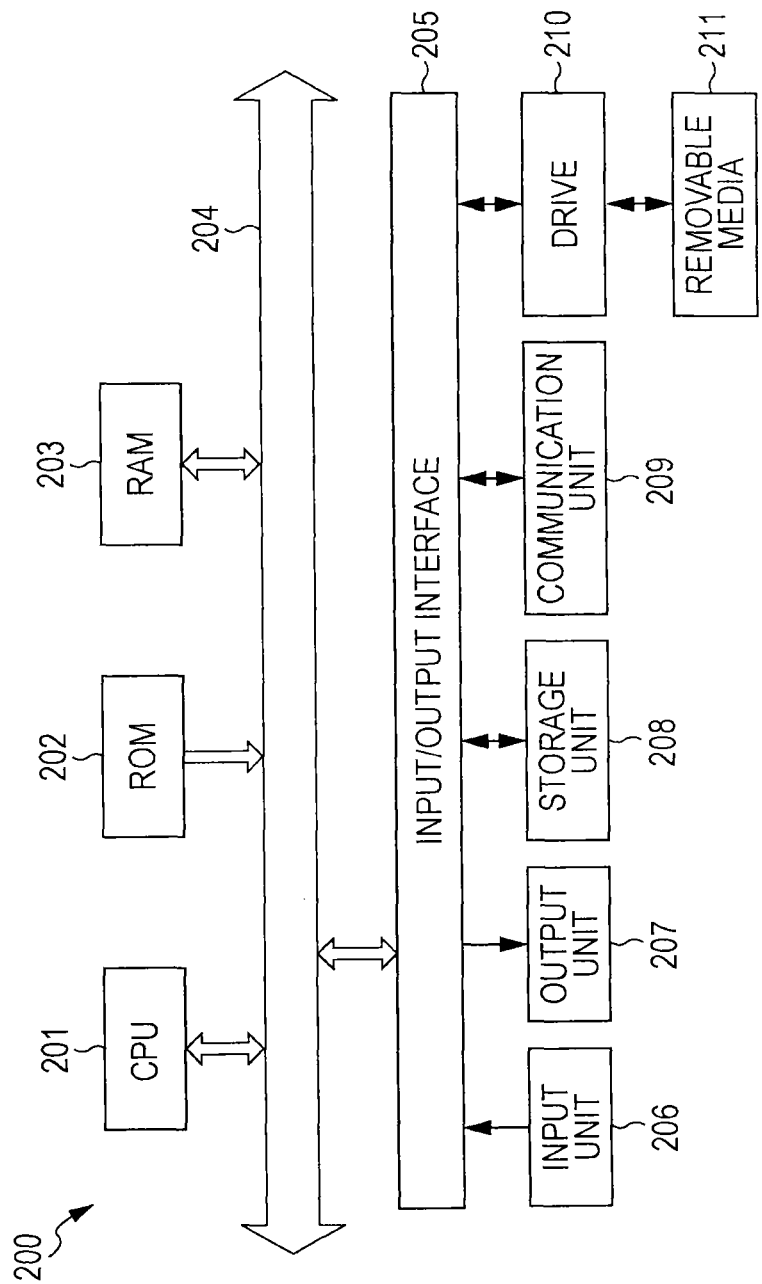
FIG. 16 is a block diagram showing an example hardware configuration of a computer.

FIG. 15 is a flowchart showing a learning process performed by the learning apparatus 110 in FIG. 14. This learning process is started, for example, when the learning apparatus 110 receives teacher signals.

In step S51 in FIG. 15, the thinning-out unit 111 of the learning apparatus 110 generates student signals corresponding to the log-scale signals by thinning out image signals of two colors from the teacher signals in accordance with a color array corresponding to the log-scale signals. The thinning-out unit 111 then provides the student signals to the blocking unit 112.

In step S92, the blocking unit 112 determines, as the pixel of interest, a pixel which has yet to be determined as the pixel of interest, of pixels in an image corresponding to the teacher signals. In step S93, the blocking unit 112 extracts a class tap from the student signals provided by the thinning-out unit 111 for each of the colors of the teacher signals and provides the class tap to the ADRC unit 113. In step S94, the blocking unit 112 extracts a prediction tap from the student signals and provides it to the operation unit 116.

In step S95, the ADRC unit 113 performs ADRC on the class tap provided by the blocking unit 112 to generate a re-quantization code and provides it to the classification unit 114.

In step S96, the classification unit 114 classifies the pixels of interest into classes for each of the colors of the teacher signals using the re-quantization code provided by the ADRC unit 113 and provides the resulting class numbers to the operation unit 116.

In step S97, the extraction unit 115 extracts the teacher signal of the pixel of interest from the teacher signals inputted from outside and provides it to the operation unit 116. In step S98, the operation unit 116 sums up the teacher signals of the pixels of interest provided by the extraction unit 115 and the prediction tap from the blocking unit 112 with respect to the class numbers of the pixels of interest provided by the classification unit 114 for each of the colors of the teacher signals.

In step S99, the blocking unit 112 determines whether all pixels in an image corresponding to the teacher signals have been determined as the pixel of interest. If not so, repeated until all pixels are determined as the pixel of interest.

If so, the thinning-out unit 11 determines, in steps S100, whether a new teacher signal has been inputted from outside. If so, the process returns to step S91, and steps S91 to S100 are repeated until new teacher signals are no longer inputted.

If not so, the operation unit 116, in step S101, solves the normal equations of Formula (10) corresponding to the respective class numbers generated in step S98, to obtain optimal prediction coefficients corresponding to the respective class numbers, thereby ending the process.

Fourth Embodiment

Computer According to Present Disclosure

The series of processes can be performed using hardware or software. If the series of processes is performed using software, first, a program including the software is installed in a computer. Examples of the computer include a computer incorporated in dedicated hardware and a computer capable of performing functions when programs are installed therein, such as a general-purpose personal computer.

FIG. 16 is a block diagram showing an example hardware configuration of a computer configured to perform the series of processes on the basis of a program.

In a computer 200, a central processing unit (CPU) 201, a read-only memory (ROM) 202, and a random access memory (RAM) 203 are connected together via a bus 204.

An input/output interface 205 is connected to the bus 204. An input unit 206, an output unit 207, a storage unit 208, a communication unit 209, and a drive 210 are connected to the input/output interface 205.

The input unit 206 includes a keyboard, a mouse, a microphone, and like. The output unit 207 includes a display, a speaker, and the like. The storage unit 208 includes a hard disk, a non-volatile memory, and the like. The communication unit 209 includes a network interface and the like. The drive 210 drives a removable medium 211 such as a magnetic disk, optical disk, magneto-optical disk, or semiconductor memory.

In the computer 200 thus configured, the series of processes is performed when the CPU 201 loads a program, for example, stored in the storage unit 208 into the RAM 203 via the input/output interface 205 and bus 204 and then executes it.

The program executed by the computer 200 (CPU 201) may be stored in the removable medium 211, which is, for example, a package medium, and then provided. The program may also be provided via a wireless transmission medium such as a local area network, Internet, or digital satellite broadcasting, or a wired transmission medium.

In the computer 200, the program may be installed into the storage unit 208 via the input/output interface 205 by inserting the removable medium 211 into the drive 210. The program may also be received by the communication unit 209 via a wired or wireless transmission medium and then installed in the storage unit 208. The program may also be previously installed in the ROM 202 or storage unit 208.

The program executed by the computer 200 may be a program which chronologically performs the processes in the order described in the present specification or program which performs the processes in parallel or at necessary timings such as when a call is made.

In the present specification, a system refers to an aggregation of multiple elements (apparatuses, modules (parts), and the like), whether all the elements are contained in the same cabinet. Accordingly, both multiple apparatuses which are contained in separate cabinets and connected together via a network and a single apparatus where multiple modules are contained in one cabinet are systems.

The effects described in the present specification are only illustrative and other effects may be obtained.

Embodiments of the present disclosure are not limited to the above embodiments, and various changes can be made thereto without departing from the spirit and scope of the present disclosure.

For example, in the second embodiment, the demosaicing unit 71 may be provided in place of the demosaicing unit 32. The colors assigned to pixels corresponding to raw signals and the colors of image signals of the pixels may be colors other than red (R), green (G), and blue (B).

The present disclosure may take a form of cloud computing where one function is shared and performed together by multiple apparatuses via a network.

The steps described with reference to the flowcharts may be performed by a single apparatus or may be performed by multiple apparatuses in a shared manner.

If a single step includes multiple processes, the processes may be performed by a single apparatus or may be performed by multiple apparatuses in a shared manner.

The present disclosure may be configured as follows:

(1) An image processing apparatus including: a gamma correction unit configured to perform gamma correction on linear-scale raw image signals to generate log-scale signals; a demosaicing unit configured to demosaic the log-scale signals generated by the gamma correction unit to generate image signals; and an inverse gamma correction unit configured to perform inverse gamma correction on the image signals generated by the demosaicing unit to generate linear-scale signals.

(2) The image processing apparatus according to the above (1), wherein the demosaicing unit is configured to demosaic the log-scale signals through classification and adaptation processes.

(3) The image processing apparatus according to the above (2), wherein the demosaicing unit is configured to generate an image signal of a pixel of interest by performing an operation using a prediction coefficient and a prediction tap, the pixel of interest being one of pixels in an image corresponding to the image signals, the prediction coefficient being learned by solving a formula indicating a relationship between a teacher signal of each pixel, student signals of pixels corresponding to the pixel, and a prediction coefficient, the teacher signal being one of teacher signals corresponding to the image signals, the student signals being included in student signals corresponding to the log-scale signals, the prediction tap including log-scale signals of pixels corresponding to the pixel of interest.

(4) The image processing apparatus according to any one of the above (1) to (3), further including a color gamut conversion unit configured to perform color gamut conversion on the linear-scale signals generated by the inverse gamma correction unit.

(5) The image processing apparatus according to any one of the above (1) to (4), further including a decoder configured to decode the raw signals which are encoded, wherein the gamma correction unit is configured to perform gamma correction on the raw signals decoded by the decoder.

(6) A method for image processing, including: performing, by an image processing apparatus, gamma correction on linear-scale raw image signals to generate log-scale signals; demosaicking, by the image processing apparatus, the log-scale signals generated in the gamma correction step to generate image signals; and performing, by the image processing apparatus, inverse gamma correction on the image signals generated in the demosaicing step to generate linear-scale signals.

(7) A program for causing a computer to function as: a gamma correction unit configured to perform gamma correction on linear-scale raw image signals to generate log-scale signals; a demosaicing unit configured to demosaic the log-scale signals generated by the gamma correction unit to generate image signals; and an inverse gamma correction unit configured to perform inverse gamma correction on the image signals generated by the demosaicing unit to generate linear-scale signals.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
    a decoder configured to decode encoded linear-scale raw image signals;
    a gamma correction unit configured to perform gamma correction on the linear-scale raw image signals decoded by the decoder to generate log-scale signals;
    a demosaicing unit configured to demosaic the log-scale signals generated by the gamma correction unit to generate image signals; and
    an inverse gamma correction unit configured to perform inverse gamma correction on the image signals generated by the demosaicing unit to generate linear-scale signals.

2. The image processing apparatus of claim 1, wherein
    the demosaicing unit is configured to demosaic the log-scale signals through classification and adaptation processes.

3. The image processing apparatus of claim 2, wherein
    the demosaicing unit is configured to generate an image signal of a pixel of interest by performing an operation using a prediction coefficient and a prediction tap, the pixel of interest being one of pixels in an image corresponding to the image signals, the prediction coefficient being learned by solving a formula indicating a relationship between a teacher signal of each pixel, student signals of pixels corresponding to the pixel, and a prediction coefficient, the teacher signal being one of teacher signals corresponding to the image signals, the student signals being included in student signals corresponding to the log-scale signals, the prediction tap including log-scale signals of pixels corresponding to the pixel of interest.

4. The image processing apparatus of claim 1, further comprising:
    a color gamut conversion unit configured to perform color gamut conversion on the linear-scale signals generated by the inverse gamma correction unit.

5. A method for image processing, comprising:
    decoding, by a decoder of an image processing apparatus, encoded linear-scale raw image signals;
    performing, by the image processing apparatus, gamma correction on the linear-scale raw image signals decoded by the decoder to generate log-scale signals;
    demosaicing, by the image processing apparatus, the log-scale signals generated in the gamma correction step to generate image signals; and
    performing, by the image processing apparatus, inverse gamma correction on the image signals generated in the demosaicing step to generate linear-scale signals.

6. The method of claim 5, wherein
    the demosaicing includes demosaicing the log-scale signals through classification and adaptation processes.

7. The method of claim 5, wherein
    the demosaicing includes demosaicing the log-scale signals using directional linear minimum mean square-error estimation (DLMMSE).

8. The method of claim 5, further comprising:
    performing color gamut conversion on the linear-scale signals.

9. The method of claim 5, further comprising:
    receiving the encoded linear-scale raw image signals via a wired or wireless transmission path.

10. A non-transitory computer-readable medium including instructions, which when executed by an information processing apparatus including a decoder configured to decode encoded linear-scale raw image signals, cause the information processing apparatus to:
    perform gamma correction on the linear-scale raw image signals decoded by the decoder to generate log-scale signals;
    demosaic the log-scale signals to generate image signals; and
    perform inverse gamma correction on the image signals to generate linear-scale signals.

11. An electronic device comprising:
    a decoder configured to decode encoded linear-scale raw image signals; and
    circuitry configured to
        perform gamma correction on the linear-scale raw image signals decoded by the decoder to generate log-scale signals;
        demosaic the log-scale signals to generate image signals; and
        perform inverse gamma correction on the image signals to generate linear-scale signals.

12. The electronic device of claim 11, wherein
    the circuitry is configured to demosaic the log-scale signals through classification and adaptation processes.

13. The electronic device of claim 12, wherein
    the circuitry is configured to generate an image signal of a pixel of interest by performing an operation using a prediction coefficient and a prediction tap.

14. The electronic device of claim 13, wherein
    the pixel of interest is one pixel in an image corresponding to the image signals.

15. The electronic device of claim 14, wherein
the prediction coefficient is learned by solving a formula indicating a relationship between a teacher signal of each pixel, student signals of pixels corresponding to the pixel, and a prediction coefficient.

16. The electronic device of claim 15, wherein
the teacher signal is one of teacher signals corresponding to the image signals and the student signals are included in student signals corresponding to the log-scale signals.

17. The electronic device of claim 16, wherein
the prediction tap includes log-scale signals of pixels corresponding to the pixel of interest.

18. The electronic device of claim 11, wherein
the circuitry is configured to perform color gamut conversion on the linear-scale signals.

19. The electronic device of claim 11, wherein
the circuitry is configured to demosaic the log-scale signals using directional linear minimum mean square-error estimation (DLMMSE).

20. The electronic device of claim 11, further comprising:
a communication interface configured to receive the encoded linear-scale raw image signals via a wired or wireless transmission path.

* * * * *